US012752322B2

(12) United States Patent
Yang et al.

(10) Patent No.: US 12,752,322 B2
(45) Date of Patent: Oct. 6, 2026

(54) CONTROL METHOD AND SYSTEM OF FRONT-END CONVEYING DEVICE FOR SOIL LEACHING REMEDIATION

(71) Applicants: China Power Construction Engineering Consulting Co., Ltd, Beijing (CN); Central South University, Changsha (CN)

(72) Inventors: Pingyuan Yang, Beijing (CN); Huanxiao Hu, Changsha (CN); Xuanyu Wu, Changsha (CN); Xiaoen Wu, Beijing (CN); Yaobing Xu, Beijing (CN); Jinglin Zhou, Beijing (CN); Mengtian Li, Beijing (CN); Xiaolong Wang, Beijing (CN); Shifan Shen, Changsha (CN); Wenqin Yan, Changsha (CN)

(73) Assignees: China Power Construction Engineering Consulting Co., Ltd, Beijing (CN); Central South University, Changsha (CN)

( * ) Notice: Subject to any disclaimer, the term of this patent is extended or adjusted under 35 U.S.C. 154(b) by 0 days.

(21) Appl. No.: 19/233,616

(22) Filed: Jun. 10, 2025

(65) Prior Publication Data

US 2026/0048425 A1 Feb. 19, 2026

(51) Int. Cl.
*B65G 43/00* (2006.01)
*B09C 1/02* (2006.01)
*B65G 43/08* (2006.01)

(52) U.S. Cl.
CPC ................ *B09C 1/02* (2013.01); *B65G 43/08* (2013.01); *B65G 2201/045* (2013.01);
(Continued)

(58) Field of Classification Search
CPC .... B09C 1/02; B65G 43/08; B65G 2201/045; B65G 2203/0258; B65G 2203/0291;
(Continued)

(56) References Cited

U.S. PATENT DOCUMENTS 4,755,206 A * 7/1988 Clark ........................ B09C 1/08
71/64.08
4,957,429 A * 9/1990 Mendenhall ............. F23G 7/14
432/13

(Continued)

FOREIGN PATENT DOCUMENTS

| | | |
|---|---|---|
| CN | 112536318 A | 3/2021 |
| CN | 114689153 A | 7/2022 |
| CN | 115909177 A | 4/2023 |

*Primary Examiner* — Edwin J Toledo-Duran
(74) *Attorney, Agent, or Firm* — Nitin Kaushik

(57) ABSTRACT

The present invention relates to a control method and system of a front-end conveying device for soil leaching remediation. The method includes: acquiring device monitoring status data, which encompasses soil weight, feeder rate, and conveyor belt speed, along with an image of the soil to be remediated from the conveying device; obtaining the soil remediation boundary region based on the image of the soil to be remediated; performing non-linear correlation mapping learning on the conveyor belt speed according to the soil weight parameters to obtain weight-conveying speed correlation data; conducting multi-level cooperative response neural network learning on the conveyor belt speed and the feeder's feeding rate based on the weight-conveying speed correlation data to generate cooperative response data for the conveying device; acquiring a monitoring image of the front-end conveying device; and deriving 3D component structure data from these images. This approach enables precise feeding control of the conveying device.

8 Claims, 4 Drawing Sheets

(52) U.S. Cl.
CPC ................ *B65G 2203/0258* (2013.01); *B65G 2203/0291* (2013.01); *B65G 2203/044* (2013.01)

(58) Field of Classification Search
CPC .. B65G 2203/044; G05B 13/042; G06N 3/04; G06N 3/08; G06T 15/005; G06T 17/00
See application file for complete search history.

(56) References Cited

U.S. PATENT DOCUMENTS

| | | | | |
|---|---|---|---|---|
| 5,037,286 | A * | 8/1991 | Roberts | B01J 2/12 264/117 |
| 5,051,031 | A * | 9/1991 | Schumacher | C05F 7/00 405/129.25 |
| 5,115,986 | A * | 5/1992 | Bateson | B03B 9/00 241/26 |
| 5,143,481 | A * | 9/1992 | Schumacher | C05D 9/00 106/900 |
| 5,161,326 | A * | 11/1992 | Weirich | B09C 1/06 110/223 |
| 5,176,087 | A * | 1/1993 | Noland | B09C 1/06 110/236 |
| 5,195,887 | A * | 3/1993 | Peterson | F23G 7/14 110/236 |
| 5,265,977 | A * | 11/1993 | Weirich | B09C 1/06 110/346 |
| 5,325,605 | A * | 7/1994 | Carew | B03B 9/06 34/526 |
| 5,436,384 | A * | 7/1995 | Grant | G21F 9/30 588/1 |
| 5,582,573 | A * | 12/1996 | Weszely | G21F 9/008 588/256 |
| 5,727,740 | A * | 3/1998 | Robinson | B03B 9/00 241/24.31 |
| 6,195,505 | B1 * | 2/2001 | Van Alstyne | A62D 3/176 392/419 |
| 6,915,908 | B2 * | 7/2005 | Bergeron | B03B 9/00 209/427 |
| 7,419,593 | B2 * | 9/2008 | Trauger | B32B 33/00 210/601 |
| 9,519,861 | B1 * | 12/2016 | Gates | G06N 20/00 |
| 2002/0169352 | A1 * | 11/2002 | Albus | B09B 3/35 588/252 |
| 2003/0132326 | A1 * | 7/2003 | Reeves | B03B 9/005 241/24.31 |
| 2006/0000767 | A1 * | 1/2006 | Trauger | B32B 5/26 210/503 |
| 2009/0032446 | A1 * | 2/2009 | Wiemers | B01D 19/0036 210/85 |
| 2011/0257788 | A1 * | 10/2011 | Wiemers | C02F 1/463 700/271 |
| 2016/0023928 | A1 * | 1/2016 | Chung | B01J 20/22 210/603 |
| 2016/0096212 | A1 * | 4/2016 | Day | B09C 1/005 405/128.7 |
| 2017/0061052 | A1 * | 3/2017 | Gates | A01G 25/167 |
| 2017/0087608 | A1 * | 3/2017 | Loureiro Pecoraro | C11D 3/188 |
| 2020/0222953 | A1 * | 7/2020 | Morrell | B01D 11/028 |
| 2022/0403250 | A1 * | 12/2022 | Batt-Rawden | B01D 17/0205 |
| 2023/0364660 | A1 * | 11/2023 | Thoreson | B09C 1/08 |
| 2024/0354653 | A1 * | 10/2024 | Fridgen | A01C 21/007 |

* cited by examiner

CONTROL METHOD AND SYSTEM OF FRONT-END CONVEYING DEVICE FOR SOIL LEACHING REMEDIATION

CROSS-REFERENCE TO RELATED APPLICATIONS

The application claims priority to Chinese patent application No. 202410762270.X, filed on Jun. 13, 2024, the entire contents of which are incorporated herein by reference.

TECHNICAL FIELD

The present invention relates to the technical field of soil washing remediation, and in particular, to a control method and system of a front-end conveying device for soil leaching remediation.

BACKGROUND

Chemical leaching technology mainly involves transferring contaminants from the soil surface into the leaching solution through desorption, decomplexation, and dissolution, and then performing cyclic treatment and processing on the leaching solution to ultimately achieve the recovery and utilization of heavy metals. This technology is highly efficient in remediating contaminated soil with large particle sizes, making it suitable for washing contaminants in gravel, sand, and low-viscosity soil. In the pretreatment stage of chemical leaching, the total amount of contaminated soil fed by the feeder and transported by the belt is not constant, but the dose of a chemical leaching agent used in the subsequent stage of removing heavy metal ions is determined based on the production capacity. If the amount of contaminated soil transported is too large, it will lead to a decrease in subsequent removal effect, and if the amount of contaminated soil is too small, it will lead to an excess of the leaching agent. Conventional soil leaching remediation devices usually rely on feeding and conveying speeds that are preset manually, which often results in material waste and fails to accurately control the conveying device. Therefore, there is a need for an intelligent control method of a front-end conveying device.

SUMMARY

In order to solve the above technical problems, the present invention proposes a control method and system of a front-end conveying device for soil leaching remediation.

To achieve the above purpose, the present invention provides a control method of a front-end conveying device for soil leaching remediation, including the following steps:

step S1: acquiring device monitoring status data and an image of to-be-remediated soil from a conveying device, where the device monitoring status data includes a soil weight parameter, a feeding rate of a feeder, and a conveyor belt speed; and obtaining a soil remediation boundary region based on the image of the to-be-remediated soil from the conveying device;

step S2: performing nonlinear correlation mapping learning on the conveyor belt speed based on the soil weight parameter to obtain weight-conveying speed correlation data; and performing multi-level cooperative response neural network learning on the conveyor belt speed and the feeding rate of the feeder based on the weight-conveying speed correlation data to generate cooperative response data of the conveying device;

step S3: acquiring a front-end conveying device monitoring image; obtaining three-dimensional structure data of components based on the front-end conveying device monitoring image; and performing dynamic parameter rendering on the three-dimensional structure data of the components based on the cooperative response data of the conveying device to construct a dynamic rendering model of the conveying device;

step S4: performing digital dynamic simulation for soil leaching on the dynamic rendering model of the conveying device to obtain dynamic simulation data for soil leaching; and performing dynamic speed parameter adjustment on the dynamic simulation data for soil leaching based on the soil remediation boundary region to obtain dynamic speed adjustment data of a conveyor belt;

step S5: performing adaptive feeding speed compensation optimization based on the dynamic speed adjustment data of the conveyor belt to obtain a transient feeding compensation speed; performing real-time parameter adjustment on the front-end conveying device based on the transient feeding compensation speed, and acquiring operating status data for real-time adjustment; and step S6: performing error parameter identification on the operating status data for real-time adjustment based on the dynamic simulation data for soil leaching to obtain a control error parameter; and performing dynamic feeding balance control optimization on the conveying device based on the control error parameter to generate a dynamic feeding control parameter so as to carry out a soil leaching remediation control operation.

According to the present invention, real-time operation information of the conveying device is provided based on the device monitoring status data, including the soil weight parameter, the feeding rate of the feeder, and the conveyor belt speed. These data are used for analyzing the working status and performance of the device. The acquisition of the image of the to-be-remediated soil from the conveying device allows for the observation of a soil region that needs to be remediated and the determination of the soil remediation boundary region. Through the nonlinear correlation mapping learning of the soil weight parameter and the conveyor belt speed, the weight-conveying speed correlation data is established, thus controlling the conveyor belt speed more accurately. By performing multi-level cooperative response neural network learning on the conveyor belt speed and the feeding rate of the feeder using the weight-conveying speed correlation data, the cooperative response data of the conveying device is acquired, and the cooperative control for the conveyor belt speed and the feeding rate of the feeder is achieved. Through the acquisition of the front-end conveying device monitoring image, the visual information on actual situations of the conveying device is provided for further analysis and control. Based on the three-dimensional structure data of the components obtained from the front-end conveying device monitoring image, accurate positions and morphological information of various components of the conveying device are provided. By performing dynamic parameter rendering on the three-dimensional structure data of the components using the cooperative response data of the conveying device, the dynamic rendering model of the conveying device is constructed for simulating the operating status and behavior of the conveying device. By performing digital dynamic simulation for soil leaching on the dynamic rendering model of the conveying device, a soil leaching process is simulated, thereby obtaining the dynamic simulation data for soil leaching. By performing dynamic speed parameter adjustment on the dynamic simulation data for soil leaching based on the soil remediation boundary region, the conveyor belt speed is dynamically adjusted according to the requirements of different remediation boundaries, so as to achieve a more accurate leaching operation. By performing adaptive feeding speed compensation optimization based on the dynamic speed adjustment data of the conveyor belt, the feeding speed is automatically adjusted according to actual speed changes of the conveyor belt, thus maintaining an appropriate soil delivery volume. By performing real-time parameter adjustment on the front-end conveying device based on the transient feeding compensation speed, the dynamic and accurate control for the conveying device is achieved, and the accuracy and stability of soil delivery can be ensured. Through the acquisition of the operating status data for real-time adjustment, the performance and status of the conveying device in actual operation can be monitored so as to provide feedback and reference for subsequent control optimization. By performing error parameter identification on the operating status data for real-time adjustment based on the dynamic simulation data for soil leaching, error situations in the actual operation are analyzed, and the control error parameter is identified for further control optimization. By performing dynamic feeding balance control optimization on the conveying device based on the control error parameter, and based on actual error situations, the working status and parameters of the feeder are dynamically adjusted, so as to achieve a more accurate soil leaching remediation control operation.

Preferably, the step S1 includes the following steps:

step S1-1: performing real-time work monitoring on the front-end conveying device to acquire the device monitoring status data, where the device monitoring status data includes the soil weight parameter, the feeding rate of the feeder, and the conveyor belt speed;

step S1-2: acquiring the image of the to-be-remediated soil from the conveying device;

step S1-3: performing visual identification of soil boundaries on the image of the to-be-remediated soil from the conveying device to extract a soil contour line;

step S1-4: performing boundary segmentation on the image of the to-be-remediated soil from the conveying device based on the soil contour line to obtain the soil remediation boundary region;

step S1-5: performing soil granularity identification on the soil remediation boundary region to obtain soil granularity; and step S1-6: performing quantitative analysis for soil contamination based on the soil granularity to obtain soil contamination degree data.

According to the present invention, by performing real-time work monitoring, the actual working status and performance parameters of the front-end conveying device are acquired. Based on the obtained soil weight parameter, information on the soil delivery volume is provided, helping to control the delivery volume. The monitoring data for the feeding rate of the feeder and the conveyor belt speed is used for analyzing the operation conditions and speed control of the conveying device. Through the acquisition of the image of the to-be-remediated soil from the conveying device, the soil region that needs to be remediated is observed, and the image of the to-be-remediated soil provides the visual information on conditions of the soil surface for further analysis and remediation work. Through visual identification of the soil boundaries, the soil contour line is extracted from the image, and the soil contour line provides geometric information on the shape of the soil surface for subsequent boundary segmentation and analysis. By performing boundary segmentation based on the soil contour line, the soil region in the image of the to-be-remediated soil from the conveying device is separated from the background, and the obtained soil remediation boundary region determines a specific scope that needs to be remediated, which provides accurate region information for subsequent soil analysis and remediation. By performing soil granularity identification on the soil remediation boundary region, the size and distribution of particles in the soil are acquired, and the obtained soil granularity information helps to further analyze the soil properties and formulate remediation strategies. By performing quantitative analysis for soil contamination using the soil granularity information, the content and distribution of contaminants in the soil can be evaluated. The obtained soil contamination degree data provides a reference basis for the soil contamination, which helps to formulate reasonable remediation plans and control strategies.

Preferably, the step S2 includes the following steps:

step S2-1: performing weight perturbation analysis on the conveyor belt speed based on the soil weight parameter to obtain conveyor belt speed perturbation data for a weight;

step S2-2: performing nonlinear correlation mapping learning on the soil weight parameter and the conveyor belt speed based on the conveyor belt speed perturbation data for the weight to obtain the weight-conveying speed correlation data;

step S2-3: performing speed fluctuation response analysis on the conveyor belt speed and the feeding rate of the feeder to obtain speed-influenced feeding response data; and step S2-4: performing multi-level cooperative response neural network learning on the weight-conveying speed correlation data and the speed-influenced feeding response data to generate the cooperative response data of the conveying device.

According to the present invention, by performing weight perturbation analysis, the degree of influence of a soil weight on the conveyor belt speed is determined, and the obtained conveyor belt speed perturbation data quantifies the relationship between the soil weight and the conveyor belt speed, providing a basis for subsequent control strategies. By performing nonlinear correlation mapping learning, a complex relationship model between the soil weight parameter and the conveyor belt speed is established, and the obtained weight-conveying speed correlation data provides a reference value for achieving a required conveyor belt speed under a given soil weight parameter. By performing speed fluctuation response analysis, a mutual influence relationship between the conveyor belt speed and the feeding rate of the feeder is determined, and the obtained feeding response data provides a reference value for adjusting the feeding rate of the feeder under a given conveyor belt speed, thereby achieving the accuracy in speed control. By performing multi-level cooperative response neural network learning, the weight-conveying speed correlation data and the speed-influenced feeding response data are comprehensively analyzed and modeled. The generated cooperative response data of the conveying device provides guidance information for achieving the dynamic and accurate control of the conveying device under the given soil weight parameter and conveyor belt speed.

Preferably, the step S3 specifically includes:

step S3-1: acquiring the front-end conveying device monitoring image;

step S3-2: performing component space topological analysis on the front-end conveying device monitoring image to obtain component space topological data;

step S3-3: performing three-dimensional structure analysis based on the component space topological data to obtain the three-dimensional structure data of the components;

step S3-4: performing three-dimensional device reconstruction on the front-end conveying device monitoring image by using the three-dimensional structure data of the components to construct a three-dimensional device structure model; and step S3-5: performing dynamic parameter rendering on the three-dimensional device structure model based on the cooperative response data of the conveying device to construct the dynamic rendering model of the conveying device.

According to the present invention, by performing weight perturbation analysis, the degree of influence of a soil weight on the conveyor belt speed is determined, and the obtained conveyor belt speed perturbation data quantifies the relationship between the soil weight and the conveyor belt speed, providing a basis for subsequent control strategies. By performing nonlinear correlation mapping learning, a complex relationship model between the soil weight parameter and the conveyor belt speed is established, and the obtained weight-conveying speed correlation data provides a reference value for achieving a required conveyor belt speed under a given soil weight parameter. By performing speed fluctuation response analysis, a mutual influence relationship between the conveyor belt speed and the feeding rate of the feeder is determined, and the obtained feeding response data provides a reference value for adjusting the feeding rate of the feeder under a given conveyor belt speed, thereby achieving the accuracy in speed control. By performing multi-level cooperative response neural network learning, the weight-conveying speed correlation data and the speed-influenced feeding response data are comprehensively analyzed and modeled. The generated cooperative response data of the conveying device provides guidance information for achieving the dynamic and accurate control of the conveying device under the given soil weight parameter and conveyor belt speed.

Preferably, the step S4 specifically includes:

step S4-1: performing the digital dynamic simulation for soil leaching on the dynamic rendering model of the conveying device to obtain the dynamic simulation data for soil leaching;

step S4-2: performing weight-speed ratio control analysis on the dynamic simulation data for soil leaching based on the weight-conveying speed correlation data to generate soil weight-conveyor belt speed ratio data;

step S4-3: performing dynamic speed parameter adjustment on the soil weight-conveyor belt speed ratio data based on the soil remediation boundary region to obtain the dynamic speed adjustment data of the conveyor belt, where the dynamic speed adjustment data of the conveyor belt includes dynamic acceleration adjustment data and dynamic deceleration adjustment data;

step S4-4: performing transient feeding speed calculation on the dynamic simulation data for soil leaching to obtain a transient feeding speed.

According to the present invention, the visual information of the front-end conveying device is provided by the monitoring image, which can reflect the current status and working condition of the front-end conveying device. Through the acquisition of the monitoring image, subsequent component analysis and structure analysis are performed, providing a necessary data basis for dynamic control. Through the component space topological analysis, various components in the front-end conveying device and spatial relationships thereof are identified and extracted, and the obtained component space topological data describes the component layout and connection method of the front-end conveying device, providing a foundation for subsequent structure analysis and reconstruction. Through the three-dimensional structure analysis, the component space topological data can be transformed into specific three-dimensional geometric information, including positions, sizes, and shapes of the components, etc. The obtained three-dimensional structure data of the components provides geometric characteristics of the front-end conveying device, which provides a foundation for subsequent device reconstruction and dynamic rendering. Through the three-dimensional device reconstruction, the three-dimensional structure data of the components and the monitoring image are fused to generate the three-dimensional device structure model with spatial geometric information. The constructed three-dimensional device structure model can more intuitively represent the form and position of the front-end conveying device, providing a basis for subsequent dynamic rendering and control. The dynamic parameter rendering uses the cooperative response data of the conveying device to associate the three-dimensional device structure model with actual working parameters, thereby achieving a dynamic visual effect. The constructed dynamic rendering model of the conveying device can simulate operating statuses of the front-end conveying device under different working conditions, providing a visual reference for dynamic and accurate control.

Preferably, the step S4-3 specifically includes:

step S4-3-1: performing morphological analysis on the soil remediation boundary region to obtain morphological data of a remediation region;

step S4-3-2: performing region area calculation on the soil remediation boundary region based on the morphological data of the remediation region to obtain an area of a to-be-remediated boundary region;

step S4-3-3: comparing an area of a to-be-remediated boundary region based on a preset area threshold of the soil remediation boundary region, and if the preset area threshold of the soil remediation boundary region is greater than the area of the to-be-remediated boundary region, determining that the soil remediation boundary region is a relatively small boundary region, and performing acceleration adjustment amplitude analysis to obtain acceleration adjustment amplitude data;

step S4-3-4: performing dynamic acceleration adjustment on the soil weight-conveyor belt speed ratio data based on the acceleration adjustment magnitude data of the conveyor belt to obtain the dynamic acceleration adjustment data;

step S4-3-5: if the preset area threshold of the soil remediation boundary region is less than or equal to the area of the to-be-remediated boundary region, determining that the soil remediation boundary region is a relatively large boundary region, and performing deceleration adjustment amplitude analysis to obtain deceleration adjustment amplitude data; and step S4-3-6: performing dynamic deceleration adjustment on the soil weight-conveyor belt speed ratio data based on the deceleration adjustment magnitude data to obtain the dynamic deceleration adjustment data.

According to the present invention, by performing morphological analysis, the morphological characteristics of the soil remediation boundary region such as the boundary shape, curvature, etc., are identified and extracted. The obtained morphological data of the remediation region provides a quantitative description for the morphological characteristics of the soil remediation boundary region, providing a foundation for subsequent area calculation and adjustment. By performing region area calculation, the size of the area of the to-be-remediated boundary region is determined, which reflects the size and complexity of a remediation scope. The obtained data on the area of the to-be-remediated boundary region provides a quantitative description for the remediation scope, thus providing a basis for subsequent determination and adjustment. The morphological analysis helps to identify and extract the morphological characteristics of the soil remediation boundary region such as the boundary shape, curvature, etc. The obtained morphological data of the remediation region provides a quantitative description for the morphological characteristics of the soil remediation boundary region, which can be used for subsequent analysis and control decision-making. By performing region area calculation, the size of the area of the to-be-remediated boundary region can be determined, thereby evaluating the size and complexity of the remediation scope. The obtained data on the area of the to-be-remediated boundary region provides the quantitative description for the remediation scope, thus providing a basis for subsequent control decision-making and resource allocation. Through the comparison with the preset area threshold, the size of the soil remediation boundary region is judged, thereby further determining whether acceleration adjustment is required. Through acceleration adjustment amplitude analysis, the degree of the acceleration adjustment can be determined, so as to achieve accurate control and rapid remediation of the relatively small boundary region. Through the dynamic acceleration adjustment, a ratio relationship between the soil weight and the conveyor belt speed can be adjusted in real time based on the acceleration adjustment amplitude data of the conveyor belt, and the obtained dynamic acceleration adjustment data provides accurate control strategies adapted to the changes in the remediation boundary region, thus optimizing the efficiency and quality of soil remediation. Based on the comparison between the preset area threshold and the area of the to-be-remediated boundary region, whether the soil remediation boundary region is the relatively large boundary region can be judged, thereby determining whether deceleration adjustment is required. Through deceleration adjustment amplitude analysis, the degree of the deceleration adjustment is determined, so as to achieve accurate control and appropriate adjustment of the relatively large boundary region.

Preferably, the step S5 specifically includes:

step S5-1: performing adaptive feeding speed compensation optimization on the transient feeding speed based on the soil contamination degree data and the dynamic speed adjustment data of the conveyor belt to obtain the transient feeding compensation speed;

step S5-2: performing optimal cooperative control decision-making on the dynamic speed adjustment data of the conveyor belt and the transient feeding compensation speed to obtain an optimal control parameter of the conveying device; and step S5-3: performing real-time parameter adjustment on the front-end conveying device based on the optimal control parameter of the conveying device, and acquiring the operating status data for real-time adjustment.

According to the present invention, by combining the soil contamination degree data and the dynamic speed adjustment data of the conveyor belt, the transient feeding speed is subjected to adaptive compensation optimization. Through the adaptive feeding speed compensation optimization, the feeding speed can be adjusted based on the real-time soil contamination degree and changes in the conveyor belt speed, thus adapting to the requirements of different contamination degrees and conveyor belt speeds. The obtained transient feeding compensation speed provides optimization and adjustment for the feeding speed, so as to achieve a more accurate soil remediation process. The dynamic speed adjustment data of the conveyor belt and the transient feeding compensation speed are combined for optimal cooperative control decision-making, thus optimizing the control parameter of the conveying device. The optimal cooperative control decision-making determines the optimal control parameter of the conveying device by comprehensively considering the influence of the conveyor belt speed and the feeding compensation speed, so as to achieve the efficient operation of the conveying device and the improvement of soil remediation quality. Based on the optimal control parameter of the conveying device, the front-end conveying device is subjected to real-time parameter adjustment, so as to optimize the operating status of the conveying device. The real-time parameter adjustment involves performing real-time adjustment on the parameters such as the speed and feeding compensation of the conveying device based on the optimal control parameter, so as to adapt to the actual soil remediation requirements and working conditions. The obtained operating status data for real-time adjustment provides real-time monitoring and feedback for the operating status of the conveying device, thus facilitating further adjustment and optimization.

Preferably, the step S5-1 specifically includes:

step S5-1-1: performing leaching material requirement calculation based on the soil contamination degree data to obtain material requirement data of a current device;

step S5-1-2: performing feeding speed range analysis on the transient feeding speed based on the dynamic speed adjustment data of the conveyor belt to obtain feeding speed range data;

step S5-1-3: performing adaptive feeding speed adjustment on the feeding speed range data based on the material requirement data of the current device to obtain an adaptive feeding speed; and step S5-1-4: performing feeding difference compensation optimization on the transient feeding speed based on the adaptive feeding speed to obtain the transient feeding compensation speed.

According to the present invention, by performing leaching material requirement calculation using the soil contamination degree data, the number of materials required by the current device is determined based on the soil contamination degree, and the obtained material requirement data of the current device provides basic information on material supply, which can be used for subsequent feeding rate adjustment and control decision-making. By analyzing the dynamic speed adjustment data of the conveyor belt, the range of the transient feeding speed, that is, reasonable upper and lower limits of speed, is determined, and the obtained feeding speed range data provides an effective control boundary of the feeding speed, ensuring that the feeding speed is within an adjustable range. The adaptive feeding speed adjustment is performed in combination with the material requirement data of the current device and the feeding speed range data, ensuring that the feeding speed meets the material requirements of the current device. The adaptive feeding speed adjustment involves adjusting the feeding speed to a most appropriate range according to actual needs, thus avoiding an excessively high or low feeding speed from adversely affecting the working effect. By performing feeding difference compensation optimization on the transient feeding speed based on the adaptive feeding speed, the accuracy and stability of feeding can be further improved. The transient feeding compensation speed considers optimization of the feeding difference based on the adaptive feeding speed, achieving a more accurate and reliable feeding speed.

Preferably, the step S6 specifically includes:

step S6-1: performing error parameter identification on the operating status data for real-time adjustment based on the dynamic simulation data for soil leaching to obtain the control error parameter;

step S6-2: performing error control optimization on the optimal control parameter of the conveying device based on the control error parameter to obtain an error optimization parameter;

step S6-3: performing dynamic feeding balance control optimization on the conveying device based on the error optimization parameter to generate a dynamic feeding control parameter; and step S6-4: carrying out the soil leaching remediation control operation based on the dynamic feeding control parameter.

According to the present invention, by performing error parameter identification on the operating status data for real-time adjustment based on the dynamic simulation data for soil leaching, the error situations in the actual operation are obtained, and the obtained control error parameter provides a quantitative description for the difference between the operating status of the conveying device and an expected target, which facilitates subsequent error control optimization. The optimal control parameter of the conveying device is adjusted and optimized based on the control error parameter, so as to reduce errors and improve the control accuracy of the device. The error control optimization involves performing optimization and adjustment on the control parameter of the conveying device based on the actual error situations, thus achieving a more accurate and stable control effect. By performing dynamic feeding balance control optimization on the conveying device based on the error optimization parameter, a more balanced and stable feeding process is achieved. The dynamic feeding control parameter considers the influence of the error optimization parameter. By adjusting the parameters in the feeding process, the feeding becomes more uniform and accurate. By performing the soil leaching remediation control operation based on the dynamic feeding control parameter, effective soil remediation and contaminant removal can be achieved. The dynamic feeding control parameter provides accurate control for the feeding process, enabling the leaching operation to accurately supply the materials and adjust the feeding speed according to actual needs.

This specification provides a control system of a front-end conveying device for soil leaching remediation, where the control system is used for executing the control method of a front-end conveying device for soil leaching remediation as described above and includes:

a remediation boundary module, configured to acquire device monitoring status data and an image of to-be-remediated soil from a conveying device, where the device monitoring status data includes a soil weight parameter, a feeding rate of a feeder, and a conveyor belt speed; and to obtain a soil remediation boundary region based on the image of the to-be-remediated soil from the conveying device;

a cooperative response module, configured to perform nonlinear correlation mapping learning on the conveyor belt speed based on the soil weight parameter to obtain weight-conveying speed correlation data, and to perform multi-level cooperative response neural network learning on the conveyor belt speed and the feeding rate of the feeder based on the weight-conveying speed correlation data to generate cooperative response data of the conveying device;

a dynamic parameter rendering module, configured to acquire a front-end conveying device monitoring image, obtain three-dimensional structure data of components based on the front-end conveying device monitoring image, and perform dynamic parameter rendering on the three-dimensional structure data of the components based on the cooperative response data of the conveying device to construct a dynamic rendering model of the conveying device;

a dynamic simulation module, configured to perform digital dynamic simulation for soil leaching on the dynamic rendering model of the conveying device to obtain dynamic simulation data for soil leaching, and to perform dynamic speed parameter adjustment on the dynamic simulation data for soil leaching based on the soil remediation boundary region to obtain dynamic speed adjustment data of a conveyor belt;

a transient feeding compensation module, configured to perform adaptive feeding speed compensation optimization based on the dynamic speed adjustment data of the conveyor belt to obtain a transient feeding compensation speed, to perform real-time parameter adjustment on the front-end conveying device based on the transient feeding compensation speed, and to acquire operating status data for real-time adjustment; and a dynamic feeding balance module, configured to perform error parameter identification on the operating status data for real-time adjustment based on the dynamic simulation data for soil leaching to obtain a control error parameter, and to perform dynamic feeding balance control optimization on the conveying device based on the control error parameter to generate a dynamic feeding control parameter so as to carry out a soil leaching remediation control operation.

According to the present invention, key input information is acquired through the acquisition of the device monitoring status data and the image of the to-be-remediated soil from the conveying device. The monitoring status data of the soil weight parameter, the feeding rate of the feeder, and the conveyor belt speed provides real-time operation conditions of the device. The soil remediation boundary region obtained based on the image of the to-be-remediated soil from the conveying device determines the specific region that needs to be remediated, providing a basis for accurate positioning of subsequent steps. By performing the nonlinear correlation mapping learning between the soil weight parameter and the conveyor belt speed, a weight-conveying speed relationship is established, providing a reference basis for the conveyor belt speed. Through the multi-level cooperative response neural network learning based on the weight-conveying speed correlation data, a complex relationship between the conveyor belt speed and the feeding rate of the feeder can be captured, and thus the cooperative response data of the conveying device is generated, which achieves the optimization control for device operation. By acquiring the front-end conveying device monitoring image and extracting the three-dimensional structure data of the components, the dynamic rendering model of the conveying device is established, and this model performs dynamic parameter rendering based on the cooperative response data of the conveying device, which can reflect the actual statuses and positions of various components of the conveying device and provide an accurate foundation for subsequent control optimization. By performing digital dynamic simulation for soil leaching on the dynamic rendering model of the conveying device, the soil leaching process is simulated and the dynamic simulation data for soil leaching is obtained. By performing dynamic speed parameter adjustment on the simulation data based on the soil remediation boundary region, the speed of the conveyor belt can be adjusted based on the requirements of the specific remediation region, thus achieving the accurate control of soil leaching. By performing adaptive feeding speed compensation optimization based on the dynamic speed adjustment data of the conveyor belt, the optimization and adjustment of the feeding speed can be achieved. The transient feeding compensation speed considers the relationship between the conveyor belt speed and the feeding rate of the feeder, which achieves more accurate feeding control through adaptive compensation. The acquisition of the operating status data for real-time adjustment reflects the actual operation conditions of the device, providing data support for the subsequent error parameter identification. By performing error parameter identification on the dynamic simulation data for soil leaching, the control error parameter is determined. By performing dynamic feeding balance control optimization on the conveying device based on the control error parameter, the dynamic feeding control parameter is generated, so as to achieve the soil leaching remediation control operation. Such control strategies can accurately adjust the device, improve the remediation effect, and minimize the errors to the greatest extent.

DETAILED DESCRIPTION OF THE EMBODIMENTS

Figure 1:
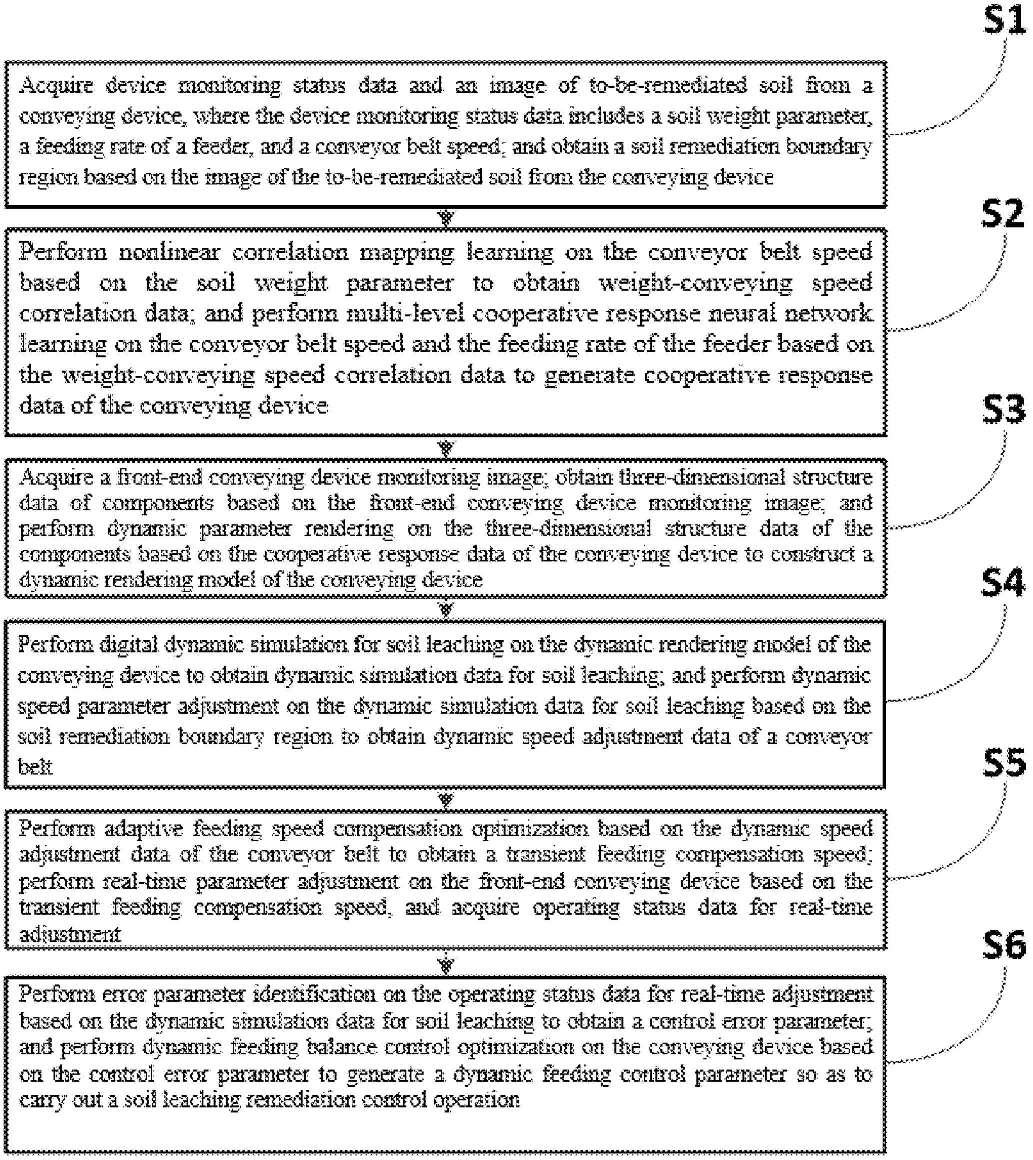
FIG. 1 is a flow diagram for steps of a control method of a front-end conveying device for soil leaching remediation according to the present invention.

It should be understood that the specific embodiments described herein are merely intended to explain the present invention, but not to limit the present invention.

Embodiments of the present application provide a control method and system of a front-end conveying device for soil leaching remediation. An executing entity of the control method and system of a front-end conveying device for soil leaching remediation includes, but is not limited to the following parts equipped with this system: mechanical equipment, a data processing platform, a cloud server node, network uploading equipment, and other elements that may function as general-purpose computing nodes of the present invention. The data processing platform includes, but is not limited to: at least one of an audio and image management system, an information management system, and a cloud data management system.

Referring to FIG. 1 to FIG. 4, the present invention provides a control method of a front-end conveying device for soil leaching remediation, including the following steps:

step S1: acquiring device monitoring status data and an image of to-be-remediated soil from a conveying device, where the device monitoring status data includes a soil weight parameter, a feeding rate of a feeder, and a conveyor belt speed; and obtaining a soil remediation boundary region based on the image of the to-be-remediated soil from the conveying device;

step S2: performing nonlinear correlation mapping learning on the conveyor belt speed based on the soil weight parameter to obtain weight-conveying speed correlation data; and performing multi-level cooperative response neural network learning on the conveyor belt speed and the feeding rate of the feeder based on the weight-conveying speed correlation data to generate cooperative response data of the conveying device;

step S3: acquiring a front-end conveying device monitoring image; obtaining three-dimensional structure data of components based on the front-end conveying device monitoring image; and performing dynamic parameter rendering on the three-dimensional structure data of the components based on the cooperative response data of the conveying device to construct a dynamic rendering model of the conveying device;

step S4: performing digital dynamic simulation for soil leaching on the dynamic rendering model of the conveying device to obtain dynamic simulation data for soil leaching; and performing dynamic speed parameter adjustment on the dynamic simulation data for soil leaching based on the soil remediation boundary region to obtain dynamic speed adjustment data of a conveyor belt;

step S5: performing adaptive feeding speed compensation optimization based on the dynamic speed adjustment data of the conveyor belt to obtain a transient feeding compensation speed; performing real-time parameter adjustment on the front-end conveying device based on the transient feeding compensation speed, and acquiring operating status data for real-time adjustment; and step S6: performing error parameter identification on the operating status data for real-time adjustment based on the dynamic simulation data for soil leaching to obtain a control error parameter; and performing dynamic feeding balance control optimization on the conveying device based on the control error parameter to generate a dynamic feeding control parameter so as to carry out a soil leaching remediation control operation.

According to the present invention, real-time operation information of the conveying device is provided based on the device monitoring status data, including the soil weight parameter, the feeding rate of the feeder, and the conveyor belt speed. These data are used for analyzing the working status and performance of the device. The acquisition of the image of the to-be-remediated soil from the conveying device allows for the observation of a soil region that needs to be remediated and the determination of the soil remediation boundary region. Through the nonlinear correlation mapping learning of the soil weight parameter and the conveyor belt speed, the weight-conveying speed correlation data is established, thus controlling the conveyor belt speed more accurately. By performing multi-level cooperative response neural network learning on the conveyor belt speed and the feeding rate of the feeder using the weight-conveying speed correlation data, the cooperative response data of the conveying device is acquired, and the cooperative control for the conveyor belt speed and the feeding rate of the feeder is achieved. Through the acquisition of the front-end conveying device monitoring image, the visual information on actual situations of the conveying device is provided for further analysis and control. Based on the three-dimensional structure data of the components obtained from the front-end conveying device monitoring image, accurate positions and morphological information of various components of the conveying device are provided. By performing dynamic parameter rendering on the three-dimensional structure data of the components using the cooperative response data of the conveying device, the dynamic rendering model of the conveying device is constructed for simulating the operating status and behavior of the conveying device. By performing digital dynamic simulation for soil leaching on the dynamic rendering model of the conveying device, a soil leaching process is simulated, thereby obtaining the dynamic simulation data for soil leaching. By performing dynamic speed parameter adjustment on the dynamic simulation data for soil leaching based on the soil remediation boundary region, the conveyor belt speed is dynamically adjusted according to the requirements of different remediation boundaries, so as to achieve a more accurate leaching operation. By performing adaptive feeding speed compensation optimization based on the dynamic speed adjustment data of the conveyor belt, the feeding speed is automatically adjusted according to actual speed changes of the conveyor belt, thus maintaining an appropriate soil delivery volume. By performing real-time parameter adjustment on the front-end conveying device based on the transient feeding compensation speed, the dynamic and accurate control for the conveying device is achieved, and the accuracy and stability of soil delivery can be ensured. Through the acquisition of the operating status data for real-time adjustment, the performance and status of the conveying device in actual operation can be monitored so as to provide feedback and reference for subsequent control optimization. By performing error parameter identification on the operating status data for real-time adjustment based on the dynamic simulation data for soil leaching, error situations in the actual operation are analyzed, and the control error parameter is identified for further control optimization. By performing dynamic feeding balance control optimization on the conveying device based on the control error parameter, and based on actual error situations, the working status and parameters of the feeder are dynamically adjusted, so as to achieve a more accurate soil leaching remediation control operation.

In an embodiment of the present invention, FIG. 1 is a flow diagram for steps of a control method of a front-end conveying device for soil leaching remediation according to the present invention. In this embodiment, the steps for the control method of a front-end conveying device for soil leaching remediation include:

step S1: acquiring device monitoring status data and an image of to-be-remediated soil from a conveying device, where the device monitoring status data includes a soil weight parameter, a feeding rate of a feeder, and a conveyor belt speed; and obtaining a soil remediation boundary region based on the image of the to-be-remediated soil from the conveying device.

In this embodiment, real-time weight data of soil on a conveyor belt is monitored based on a sensor, a real-time rotational speed of the feeder is monitored, the feeding rate is calculated, and a real-time operating speed of the conveyor belt is monitored. A high-definition camera is installed on the conveying device to capture and collect image data of the to-be-remediated soil in real time. A sufficiently high image resolution is ensured, allowing to capture detailed information of the soil surface clearly. Textures, colors, and other characteristics of the soil surface are identified to distinguish a to-be-remediated region. A boundary position and scope of the to-be-remediated region are determined based on distribution of soil characteristics.

Step S2: performing nonlinear correlation mapping learning on the conveyor belt speed based on the soil weight parameter to obtain weight-conveying speed correlation data; and performing multi-level cooperative response neural network learning on the conveyor belt speed and the feeding rate of the feeder based on the weight-conveying speed correlation data to generate cooperative response data of the conveying device.

In this embodiment, by using machine learning methods such as regression analysis and neural networks, a nonlinear mapping relationship between soil weight and the conveyor belt speed is fitted, the weight-conveying speed correlation data is obtained, which describes corresponding changes in the conveyor belt speed when the soil weight changes. Based on the weight-conveying speed correlation data as an input, the conveyor belt speed and the feeding rate of the feeder are simultaneously input to construct a multi-layer perceptron neural network model for learning a cooperative response relationship between the conveyor belt speed and the feeding rate of the feeder. A hidden layer of the network can capture a complex correlation between these two parameters, reflecting a multi-level cooperative response mechanism of the device. A network model obtained from training is the cooperative response data of the conveying device, which describes linkage changes of the two key parameters.

Step S3: acquiring a front-end conveying device monitoring image; obtaining three-dimensional structure data of components based on the front-end conveying device monitoring image; and performing dynamic parameter rendering on the three-dimensional structure data of the components based on the cooperative response data of the conveying device to construct a dynamic rendering model of the conveying device.

In this embodiment, a plurality of cameras are installed at a front end of the conveying device to collect image data of various components of the device in real time. With the use of technologies such as structured light scanning and multi-view reconstruction, three-dimensional structures of the various components are reconstructed by using front-end monitoring image data. These three-dimensional models can accurately describe geometric shapes and spatial position information of the various components of the conveying device. Based on the cooperative response data of the conveying device, such as the conveyor belt speed and the feeding rate of the feeder, the information is mapped to corresponding parameters of the three-dimensional models. By adopting dynamic rendering technologies of computer graphics and based on the real-time cooperative response data, the visual effects of the conveying device in different working statuses are generated. The dynamic rendering model constructed in this manner can intuitively reflect motion statuses of the various components of the conveying device under action of the cooperative response.

Step S4: performing digital dynamic simulation for soil leaching on the dynamic rendering model of the conveying device to obtain dynamic simulation data for soil leaching; and performing dynamic speed parameter adjustment on the dynamic simulation data for soil leaching based on the soil remediation boundary region to obtain dynamic speed adjustment data of a conveyor belt.

In this embodiment, based on the dynamic rendering model of the conveying device as a simulation platform, physical processes of soil leaching, such as liquid flow, solid particle movement, etc., are introduced into the model for digital simulation calculation. During a simulation process, a movement trajectory of each component, a liquid flow speed, and other parameter data, that is, the dynamic simulation data for soil leaching, are recorded. Soil remediation boundaries are arranged in certain regions of the conveying device according to the actual situations. The obtained dynamic simulation data for soil leaching is analyzed to identify the liquid flow and solid particle movement passing through the remediation boundary region. In response to these flows and movements passing through the remediation boundaries, the conveyor belt speed parameter is dynamically adjusted to meet the requirements of soil remediation, and the obtained dynamic speed adjustment data of the conveyor belt describes the conveyor belt speed that needs to be dynamically adjusted to achieve the soil remediation.

Step S5: performing adaptive feeding speed compensation optimization based on the dynamic speed adjustment data of the conveyor belt to obtain a transient feeding compensation speed; performing real-time parameter adjustment on the front-end conveying device based on the transient feeding compensation speed, and acquiring operating status data for real-time adjustment.

In this embodiment, an adaptive feeding speed compensation algorithm is established, and the feeding speed of the feeder is dynamically adjusted based on real-time changes in the conveyor belt speed, ensuring that the materials can enter the remediation region on time and accurately. This algorithm needs to consider the time lag characteristics of the changes in the conveyor belt speed and uses advanced strategies such as predictive control to obtain an optimal transient feeding compensation speed. The control system adjusts an actual feeding speed of the feeder based on the compensation speed, ensuring that the materials can enter the soil remediation region accurately. The control system can also collect various operating parameters of the conveying device after adjustment, such as an actual conveyor belt speed, a feeding frequency of the feeder, etc., so as to form the operating status data for real-time adjustment.

Step S6: performing error parameter identification on the operating status data for real-time adjustment based on the dynamic simulation data for soil leaching to obtain a control error parameter; and performing dynamic feeding balance control optimization on the conveying device based on the control error parameter to generate a dynamic feeding control parameter so as to carry out a soil leaching remediation control operation.

In this embodiment, key parameters that lead to deviations, such as the actual conveyor belt speed, the actual feeding frequency of the feeder, etc., are identified to form the control error parameters. These error parameters reflect the difference between an actual system and a simulation model, providing a basis for subsequent control optimization. The operating status of the conveying device is monitored in real time, and adaptive adjustment is performed based on the error parameters, so as to ensure that the materials can enter the soil remediation region uniformly and accurately. The dynamic characteristics of the feeder, the changes in the conveyor belt speed, and other factors need to be considered during an algorithm optimization process, so as to obtain the optimal dynamic feeding control parameters. The optimized dynamic feeding control parameters are sent to the control system of the conveying device in real time through a field bus or a wireless network. The control system adjusts actual feeding behaviors of the feeder based on these parameters, ensuring that the materials can enter the soil remediation region according to the requirements. The control system can also monitor an adjusted system operating status in real time to provide feedback information for the subsequent control optimization.

Figure 2:
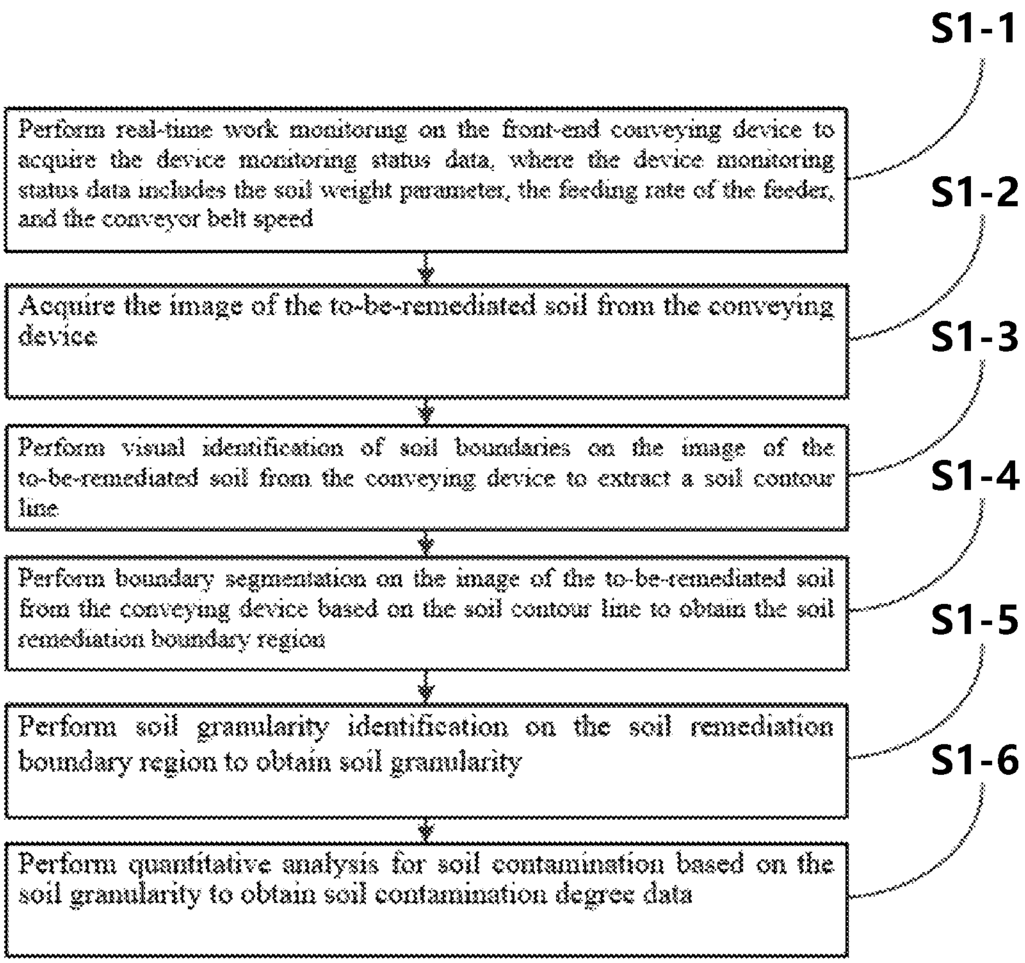
FIG. 2 is a flow diagram of detailed implementation steps of step S1.

In this embodiment, FIG. 2 is flow diagram of detailed implementation steps of step S1. In this embodiment, the detailed implementation steps of step S1 include:

- step S1-1: performing real-time work monitoring on the front-end conveying device to acquire the device monitoring status data, where the device monitoring status data includes the soil weight parameter, the feeding rate of the feeder, and the conveyor belt speed;
- step S1-2: acquiring the image of the to-be-remediated soil from the conveying device;
- step S1-3: performing visual identification of soil boundaries on the image of the to-be-remediated soil from the conveying device to extract a soil contour line;
- step S1-4: performing boundary segmentation on the image of the to-be-remediated soil from the conveying device based on the soil contour line to obtain the soil remediation boundary region;
- step S1-5: performing soil granularity identification on the soil remediation boundary region to obtain soil granularity; and
- step S1-6: performing quantitative analysis for soil contamination based on the soil granularity to obtain soil contamination degree data.

In this embodiment, the soil weight parameter, the feeding rate of the feeder, and the conveyor belt speed are acquired based on the sensor of the front-end conveying device. A high-definition camera is deployed on the conveying device to collect the image of the to-be-remediated soil in real time, ensuring that the image resolution is sufficiently high and detailed characteristics of the soil can be shown clearly. According to the actual situations, a plurality of cameras are used to perform stereoscopic shooting, thus obtaining richer soil information. Image processing algorithms such as edge detection and region segmentation are used to identify boundary contour lines of the soil on the soil image, and the key to contour line extraction lies in accurately distinguishing the soil from other background elements, which requires optimization based on the soil colors, textures, and other characteristics. Deep learning-based image segmentation technologies are used to improve the accuracy and stability of contour line identification. An original soil image is subjected to segmentation processing, and a boundary region of concern for soil remediation is clearly divided after segmentation. The determination of the boundary region is crucial for subsequent soil granularity identification and contamination analysis. Image analysis technologies are used to identify the particle size distribution of particles in the soil, the characteristics such as the particle shapes and textures are used for analysis, and a pre-trained machine learning model is combined to achieve automated identification. Chemical analysis, spectral analysis, and other means are used to perform quantitative detection on the contaminants in the soil. Aiming at major contaminant indicators such as heavy metals and organic matters, contaminant concentration data of the soil is obtained. The soil contamination degree data is the key input for formulating soil remediation plans, providing a basis for the subsequent remediation process.

Figure 3:
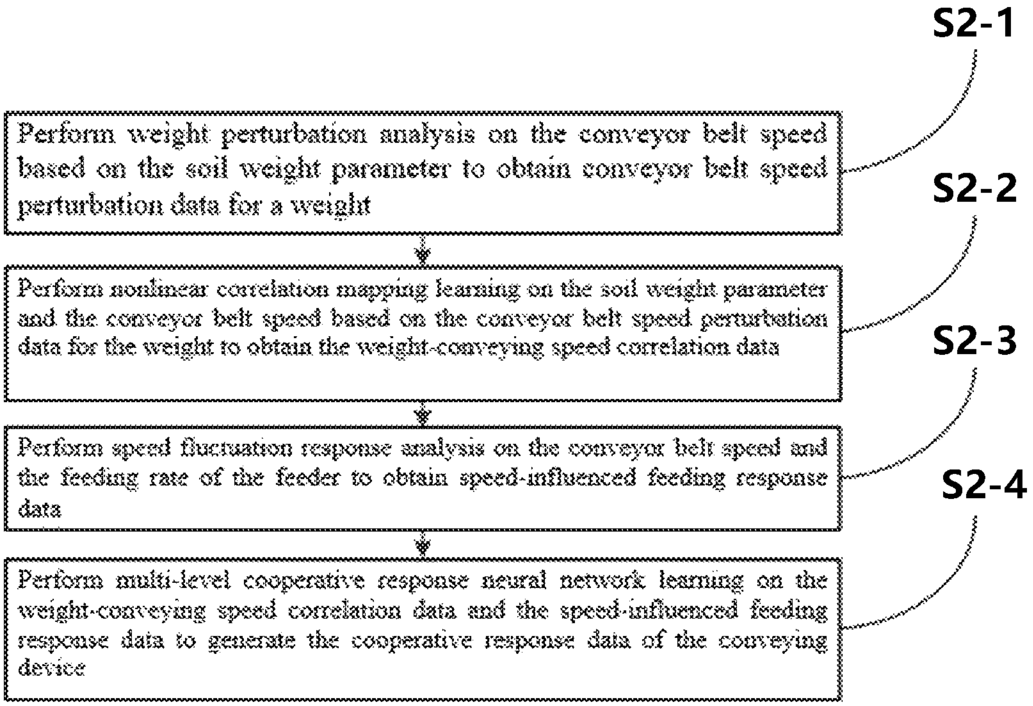
FIG. 3 is a flow diagram of detailed implementation steps of step S2.

In this embodiment, FIG. 3 is flow diagram of detailed implementation steps of step S2. In this embodiment, the detailed implementation steps of step S2 include:

step S2-1: performing weight perturbation analysis on the conveyor belt speed based on the soil weight parameter to obtain conveyor belt speed perturbation data for a weight;

step S2-2: performing nonlinear correlation mapping learning on the soil weight parameter and the conveyor belt speed based on the conveyor belt speed perturbation data for the weight to obtain the weight-conveying speed correlation data;

step S2-3: performing speed fluctuation response analysis on the conveyor belt speed and the feeding rate of the feeder to obtain speed-influenced feeding response data; and step S2-4: performing multi-level cooperative response neural network learning on the weight-conveying speed correlation data and the speed-influenced feeding response data to generate the cooperative response data of the conveying device.

In this embodiment, a weighing sensor is installed on the conveying device to monitor the weight change of the soil in real time. The actual operating speed of the conveyor belt under different soil weights is recorded, the perturbation of the speed caused by the weight change is analyzed, and a real-time corresponding relationship of weight-speed is established, so as to obtain detailed weight perturbation data. A nonlinear regression model is used to model the relationship of the weight-speed. Machine learning algorithms such as neural networks and support vector machines are used to fit a nonlinear correlation function between the weight and speed, so as to obtain accurate weight-conveying speed correlation data, thus providing a foundation for subsequent cooperative response analysis. The conveyor belt speed and the feeding rate of the feeder are synchronously monitored, a dynamic response relationship therebetween is analyzed, and the influence of speed fluctuations on the feeding process is studied, thereby obtaining detailed speed-feeding response data. A multi-layer perceptron (MLP) neural network model is constructed by using the soil weight, the conveyor belt speed, and the feeding rate of the feeder as input features, and the neural network model is subjected to end-to-end supervised learning training by using the weight-conveying speed correlation data and the speed-influenced feeding response data mentioned above. During a training process, the network will automatically learn a complex nonlinear mapping relationship among the soil weight, the conveyor belt speed, and the feeding rate of the feeder, and an intelligent response model that can cooperatively control the conveyor belt speed and the feeding rate of the feeder is finally obtained. The trained neural network model is applied to the actual control of the conveying device to output the cooperative response data in real time.

Figure 4:
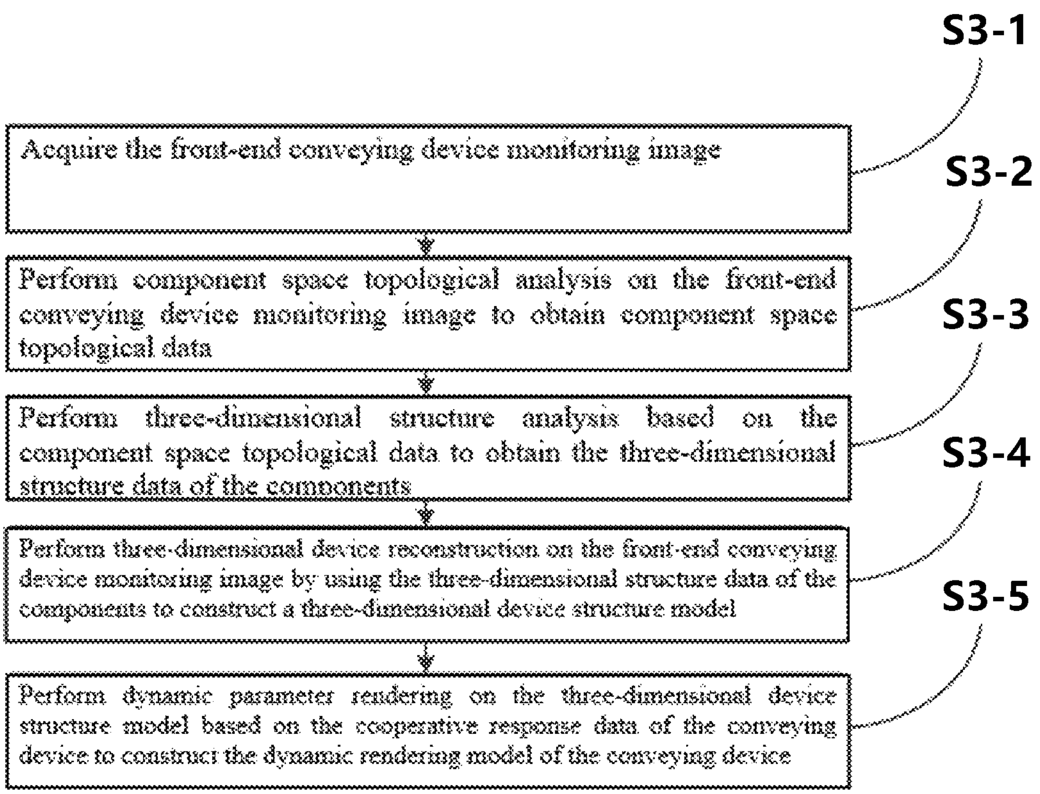
FIG. 4 is a flow diagram of detailed implementation steps of step S3.

In this embodiment, FIG. 4 describes a flow diagram of detailed implementation steps of step S3. In this embodiment, the detailed implementation steps of step S3 include:

step S3-1: acquiring the front-end conveying device monitoring image;

step S3-2: performing component space topological analysis on the front-end conveying device monitoring image to obtain component space topological data;

step S3-3: performing three-dimensional structure analysis based on the component space topological data to obtain the three-dimensional structure data of the components;

step S3-4: performing three-dimensional device reconstruction on the front-end conveying device monitoring image by using the three-dimensional structure data of the components to construct a three-dimensional device structure model; and step S3-5: performing dynamic parameter rendering on the three-dimensional device structure model based on the cooperative response data of the conveying device to construct the dynamic rendering model of the conveying device.

In this embodiment, a plurality of high-definition cameras are installed on the front-end conveying device to collect monitoring images of the device in real time. The collected image data is transmitted to computing equipment for subsequent image analysis and processing, ensuring that the resolution, clarity, and collection frequency of the images can meet the requirements of subsequent analysis. By using computer vision technologies, the collected device images are subjected to target detection and segmentation, various components are identified, relative positions and connection relationships between the components are analyzed, a spatial topological structure between the components is established, and the topological information is encoded into structured data, which serves as a foundation for subsequent three-dimensional reconstruction. By using the computer vision technologies, three-dimensional shapes and sizes of each component are reconstructed from the image data collected from multiple angles. Combined with the obtained topological information of the components, these three-dimensional models are assembled into a complete three-dimensional device structure. Accurate three-dimensional component structure data is output, providing necessary geometric information for subsequent three-dimensional device reconstruction. Various components are assembled into a complete three-dimensional device model according to the topological relationship of the components. By using dynamic rendering functions of three-dimensional modeling and simulation software and by adjusting relevant parameter values, the three-dimensional model can dynamically reflect the real-time operating status of the conveying device. By performing texture mapping, material assignment, and other processing on the model, the visual effect of the model can be closer to that of a real device, and a high-fidelity three-dimensional structure model of the conveying device is finally output. Based on the cooperative response data, various components of the three-dimensional model are subjected to dynamic simulation and rendering. The movement characteristics and status changes of the device in the actual working conditions are simulated to construct a dynamic three-dimensional device model, and a final dynamic rendering model of the conveying device is output, thus providing visual support for subsequent simulation analysis.

In this embodiment, step S4 includes the following steps:

step S4-1: performing the digital dynamic simulation for soil leaching on the dynamic rendering model of the conveying device to obtain the dynamic simulation data for soil leaching;

step S4-2: performing weight-speed ratio control analysis on the dynamic simulation data for soil leaching based on the weight-conveying speed correlation data to generate soil weight-conveyor belt speed ratio data;

step S4-3: performing dynamic speed parameter adjustment on the soil weight-conveyor belt speed ratio data based on the soil remediation boundary region to obtain the dynamic speed adjustment data of the conveyor belt, where the dynamic speed adjustment data of the conveyor belt includes dynamic acceleration adjustment data and dynamic deceleration adjustment data;

step S4-4: performing transient feeding speed calculation on the dynamic simulation data for soil leaching to obtain a transient feeding speed.

In this embodiment, a three-dimensional CAD model of the conveying device is established, and the dynamic leaching process of the soil is simulated in the model. Key parameters in the soil leaching process, such as a water flow velocity, a flow rate, temperature, etc. are set by using a computational fluid dynamics (CFD) simulation technology. Based on CFD simulation, the dynamic change situations of the soil in the entire leaching process are acquired, and the dynamic simulation data for soil leaching is formed. With reference to actual test data, a correlation model between the operating speed of the conveying device and the soil weight is established. The obtained dynamic simulation data for soil leaching is input into the correlation model for analysis. The parameters of the conveyor belt speed meeting the requirements of soil leaching are obtained through the analysis, so as to form the soil weight-conveyor belt speed ratio data. Through determination and analysis of the remediation boundary region, whether acceleration or deceleration is required is determined. A weight-speed ratio model is dynamically adjusted based on the obtained acceleration/deceleration adjustment amplitude data to analyze the flow characteristics of the soil on the conveyor belt. The adjusted conveyor belt speed parameter is the required dynamic speed adjustment data of the conveyor belt, including both acceleration and deceleration. For the distribution of the soil on the conveyor belt at a certain moment, an ideal feeding speed is calculated to ensure that the soil is leached uniformly.

In this embodiment, step S4-3 specifically includes the following steps:

step S4-3-1: performing morphological analysis on the soil remediation boundary region to obtain morphological data of a remediation region;

step S4-3-2: performing region area calculation on the soil remediation boundary region based on the morphological data of the remediation region to obtain an area of a to-be-remediated boundary region;

step S4-3-3: comparing an area of a to-be-remediated boundary region based on a preset area threshold of the soil remediation boundary region, and if the preset area threshold of the soil remediation boundary region is greater than the area of the to-be-remediated boundary region, determining that the soil remediation boundary region is a relatively small boundary region, and performing acceleration adjustment amplitude analysis to obtain acceleration adjustment amplitude data;

step S4-3-4: performing dynamic acceleration adjustment on the soil weight-conveyor belt speed ratio data based on the acceleration adjustment magnitude data of the conveyor belt to obtain the dynamic acceleration adjustment data;

step S4-3-5: if the preset area threshold of the soil remediation boundary region is less than or equal to the area of the to-be-remediated boundary region, determining that the soil remediation boundary region is a relatively large boundary region, and performing deceleration adjustment amplitude analysis to obtain deceleration adjustment amplitude data; and step S4-3-6: performing dynamic deceleration adjustment on the soil weight-conveyor belt speed ratio data based on the deceleration adjustment magnitude data to obtain the dynamic deceleration adjustment data.

In this embodiment, the acquired data is processed and analyzed to analyze geometric morphological parameters of the boundary region, such as the length and width. A total area of the to-be-remediated boundary region is calculated based on the morphological data of the remediation region. Based on the preset area threshold of the soil remediation boundary region as a judgment criterion, a comparison between the area of the to-be-remediated boundary region and the preset threshold is performed. If the threshold is greater than a to-be-remediated area, it is determined that the boundary region is the relatively small boundary region; and otherwise, it is determined that the boundary region is the relatively large boundary region. For the relatively small boundary region, the space and scope where the conveyor belt speed is increased appropriately are analyzed, the acceleration adjustment amplitude parameter required in this case is calculated, the dynamic acceleration adjustment parameter in the relatively small boundary region is calculated, and the dynamic acceleration adjustment data is output to provide a basis for subsequent intelligent control. For the relatively large remediation boundary region, the space and scope where the conveyor belt speed needs to be reduced appropriately are analyzed, the deceleration adjustment amplitude parameter required in this case is calculated, and the dynamic deceleration adjustment parameter in the relatively large boundary region is calculated.

In this embodiment, step S5 specifically includes the following steps:

step S5-1: performing adaptive feeding speed compensation optimization on the transient feeding speed based on the soil contamination degree data and the dynamic speed adjustment data of the conveyor belt to obtain the transient feeding compensation speed;

step S5-2: performing optimal cooperative control decision-making on the dynamic speed adjustment data of the conveyor belt and the transient feeding compensation speed to obtain an optimal control parameter of the conveying device; and step S5-3: performing real-time parameter adjustment on the front-end conveying device based on the optimal control parameter of the conveying device, and acquiring the operating status data for real-time adjustment.

In this embodiment, the transient feeding speed is correspondingly adjusted in combination with the dynamic speed adjustment data of the conveyor belt. The feeding speed is dynamically optimized by adopting an adaptive algorithm based on real-time contamination degrees and changes in the conveyor belt speed, thus ensuring that the soil is adequately leached during a conveying process. By using a multi-objective optimization algorithm, an optimal combination of parameters such as the conveyor belt speed and the feeding speed is searched for under the premise of meeting the requirements of soil remediation. The optimal control parameter of the conveying device is obtained through optimization calculation, including a speed adjustment strategy, a feeding compensation strategy, etc. The operating status data of the conveying device is acquired in real time through sensor monitoring, including the speed, feeding situations, etc. The real-time data is fed back to the optimization model mentioned above, and the control parameter is continuously optimized to form a closed-loop control.

In this embodiment, step S5-1 specifically includes the following steps:

step S5-1-1: performing leaching material requirement calculation based on the soil contamination degree data to obtain material requirement data of a current device;

step S5-1-2: performing feeding speed range analysis on the transient feeding speed based on the dynamic speed adjustment data of the conveyor belt to obtain feeding speed range data;

step S5-1-3: performing adaptive feeding speed adjustment on the feeding speed range data based on the material requirement data of the current device to obtain an adaptive feeding speed; and step S5-1-4: performing feeding difference compensation optimization on the transient feeding speed based on the adaptive feeding speed to obtain the transient feeding compensation speed.

In this embodiment, the soil contamination degree data is acquired through soil sampling and analysis or other soil detection methods. The data indicates the soil contamination degrees in different regions, for example, concentrations of contaminants or contamination grades. A predefined material requirement model or algorithm is used to transform the soil contamination degree data into corresponding leaching material requirements. The model or algorithm calculates the material requirements by considering the severity, area, depth, and other factors of the soil contamination, and combines a calculation result of the leaching material requirements with the operating parameter and real-time status data of the conveying device to obtain the material requirement data of the current device. These data indicates the amount of the materials required for the current device during leaching remediation. An adjustable range of the transient feeding speed is calculated and determined by combining the conveyor belt speed data and the characteristic parameters of the feeder and using a predefined feeding speed analysis model or algorithm. This range considers the influence of the changes in the conveyor belt speed and ensures that the feeding speed is within a safe and efficient range. The adaptive feeding speed adjustment is performed based on the material requirement data of the current device and in combination with the feeding speed range data and the control strategy of the feeder. This adjustment involves operations of increasing, decreasing, or maintaining the feeding speed to meet the material requirements of the current device. A value of the adaptive feeding speed is obtained based on the adjusted feeding speed, which can meet the material requirements of the current device and considers the limitations on the feeding speed range and changes in the actual operating status of the device.

In this embodiment, step S6 specifically includes the following steps:

step S6-1: performing error parameter identification on the operating status data for real-time adjustment based on the dynamic simulation data for soil leaching to obtain the control error parameter;

step S6-2: performing error control optimization on the optimal control parameter of the conveying device based on the control error parameter to obtain an error optimization parameter;

step S6-3: performing dynamic feeding balance control optimization on the conveying device based on the error optimization parameter to generate a dynamic feeding control parameter; and step S6-4: carrying out the soil leaching remediation control operation based on the dynamic feeding control parameter.

In this embodiment, deviations between the actual situations and simulation results under different operating statuses are analyzed, and these deviations are statistically analyzed to identify key error parameters affecting the control of the system, such as a conveyor belt speed error, a feeding amount error, etc. An optimization algorithm is used to adjust the key control parameters of the conveying device, with the goals of minimizing the deviations of these key parameters and obtaining a set of optimized parameters that can effectively inhibit the control error. By optimizing the parameters such as the conveyor belt speed, the rotational speed of a feeding motor, etc., the actual operating status can be as close as possible to an ideal status. A dynamic balance control algorithm is used to perform optimization and adjustment on the feeding speed and amount based on the real-time operation status data, with the goal of ensuring that an entire conveying system is in an optimal feeding balance status and the materials are distributed uniformly. After optimization, the dynamic feeding control parameters that can meet the actual remediation requirements can be obtained. The conveyor belt speed, the feeding motor, etc. are adjusted and controlled in real time based on these control parameters to ensure that the delivery volume and distribution of the materials during the entire remediation process can meet the requirements, thereby improving the remediation effect. The operating status of the entire system is monitored and optimized, so as to ensure the stability and reliability of the remediation work.

This embodiment provides a control system of a front-end conveying device for soil leaching remediation, where the control system is used for executing the control method of a front-end conveying device for soil leaching remediation as described above and includes:

a remediation boundary module, configured to acquire device monitoring status data and an image of to-be-remediated soil from a conveying device, where the device monitoring status data includes a soil weight parameter, a feeding rate of a feeder, and a conveyor belt speed; and to obtain a soil remediation boundary region based on the image of the to-be-remediated soil from the conveying device;

a cooperative response module, configured to perform nonlinear correlation mapping learning on the conveyor belt speed based on the soil weight parameter to obtain weight-conveying speed correlation data, and to perform multi-level cooperative response neural network learning on the conveyor belt speed and the feeding rate of the feeder based on the weight-conveying speed correlation data to generate cooperative response data of the conveying device;

a dynamic parameter rendering module, configured to acquire a front-end conveying device monitoring image, obtain three-dimensional structure data of components based on the front-end conveying device monitoring image, and perform dynamic parameter rendering on the three-dimensional structure data of the components based on the cooperative response data of the conveying device to construct a dynamic rendering model of the conveying device;

a dynamic simulation module, configured to perform digital dynamic simulation for soil leaching on the dynamic rendering model of the conveying device to obtain dynamic simulation data for soil leaching, and to perform dynamic speed parameter adjustment on the dynamic simulation data for soil leaching based on the soil remediation boundary region to obtain dynamic speed adjustment data of a conveyor belt;

a transient feeding compensation module, configured to perform adaptive feeding speed compensation optimization based on the dynamic speed adjustment data of the conveyor belt to obtain a transient feeding compensation speed, to perform real-time parameter adjustment on the front-end conveying device based on the transient feeding compensation speed, and to acquire operating status data for real-time adjustment; and a dynamic feeding balance module, configured to perform error parameter identification on the operating status data for real-time adjustment based on the dynamic simulation data for soil leaching to obtain a control error parameter, and to perform dynamic feeding balance control optimization on the conveying device based on the control error parameter to generate a dynamic feeding control parameter so as to carry out a soil leaching remediation control operation.

According to the present invention, key input information is acquired through the acquisition of the device monitoring status data and the image of the to-be-remediated soil from the conveying device. The monitoring status data of the soil weight parameter, the feeding rate of the feeder, and the conveyor belt speed provides real-time operation conditions of the device. The soil remediation boundary region obtained based on the image of the to-be-remediated soil from the conveying device determines the specific region that needs to be remediated, providing a basis for accurate positioning of subsequent steps. By performing the nonlinear correlation mapping learning between the soil weight parameter and the conveyor belt speed, a weight-conveying speed relationship is established, providing a reference basis for the conveyor belt speed. Through the multi-level cooperative response neural network learning based on the weight-conveying speed correlation data, a complex relationship between the conveyor belt speed and the feeding rate of the feeder can be captured, and thus the cooperative response data of the conveying device is generated, which achieves the optimization control for device operation. By acquiring the front-end conveying device monitoring image and extracting the three-dimensional structure data of the components, the dynamic rendering model of the conveying device is established, and this model performs dynamic parameter rendering based on the cooperative response data of the conveying device, which can reflect the actual statuses and positions of various components of the conveying device and provide an accurate foundation for subsequent control optimization. By performing digital dynamic simulation for soil leaching on the dynamic rendering model of the conveying device, the soil leaching process is simulated and the dynamic simulation data for soil leaching is obtained. By performing dynamic speed parameter adjustment on the simulation data based on the soil remediation boundary region, the speed of the conveyor belt can be adjusted based on the requirements of the specific remediation region, thus achieving the accurate control of soil leaching. By performing adaptive feeding speed compensation optimization based on the dynamic speed adjustment data of the conveyor belt, the optimization and adjustment of the feeding speed can be achieved. The transient feeding compensation speed considers the relationship between the conveyor belt speed and the feeding rate of the feeder, which achieves more accurate feeding control through adaptive compensation. The acquisition of the operating status data for real-time adjustment reflects the actual operation conditions of the device, providing data support for the subsequent error parameter identification. By performing error parameter identification on the dynamic simulation data for soil leaching, the control error parameter is determined. By performing dynamic feeding balance control optimization on the conveying device based on the control error parameter, the dynamic feeding control parameter is generated, so as to achieve the soil leaching remediation control operation. Such control strategies can accurately adjust the device, improve the remediation effect, and minimize the errors to the greatest extent.

The embodiments are therefore to be considered in all respects as illustrative and not restrictive, the scope of the present invention being defined by the appended claims rather than by the above description, and all changes which fall within the meaning and scope of equivalent elements of the application document are therefore intended to be embraced therein.

The foregoing descriptions are merely specific implementations of the present invention, enabling those skilled in the art to understand or implement the present invention. Various modifications to these embodiments will be readily apparent to those skilled in the art, and the generic principles defined herein may be implemented in other embodiments without departing from the spirit or scope of the present invention. Therefore, the present invention will not be limited to these embodiments shown herein, but is to be in accordance with the widest scope consistent with the principles and novel features invented herein.

What is claimed is:

1. A control method of a front-end conveying device for soil leaching remediation, performed by a system comprising at least one general-purpose computing node, the method comprising the following steps:

step S1: acquiring device monitoring status data and an image of to-be-remediated soil from a conveying device, wherein the device monitoring status data comprises a soil weight parameter, a feeding rate of a feeder, and a conveyor belt speed; and obtaining a soil remediation boundary region based on the image of the to-be-remediated soil from the conveying device;

step S2: performing nonlinear correlation mapping learning on the conveyor belt speed based on the soil weight parameter to obtain weight-conveying speed correlation data; and performing multi-level cooperative response neural network learning on the conveyor belt speed and the feeding rate of the feeder based on the weight-conveying speed correlation data to generate cooperative response data of the conveying device;

step S3: acquiring a front-end conveying device monitoring image; obtaining three-dimensional structure data of components based on the front-end conveying device monitoring image; and performing dynamic parameter rendering on the three-dimensional structure data of the components based on the cooperative response data of the conveying device to construct a dynamic rendering model of the conveying device; and step S4: performing digital dynamic simulation for soil leaching on the dynamic rendering model of the conveying device to obtain dynamic simulation data for soil leaching; and performing dynamic speed parameter adjustment on the dynamic simulation data for soil leaching based on the soil remediation boundary region to obtain dynamic speed adjustment data of a conveyor belt; wherein the step S4 specifically comprises:

step S4-1: performing the digital dynamic simulation for soil leaching on the dynamic rendering model of the conveying device to obtain the dynamic simulation data for soil leaching;

step S4-2: performing weight-speed ratio control analysis on the dynamic simulation data for soil leaching based on the weight-conveying speed correlation data to generate soil weight-conveyor belt speed ratio data;

step S4-3: performing dynamic speed parameter adjustment on the soil weight-conveyor belt speed ratio data based on the soil remediation boundary region to obtain the dynamic speed adjustment data of the conveyor belt, wherein the dynamic speed adjustment data of the conveyor belt comprises dynamic acceleration adjustment data and dynamic deceleration adjustment data, and the step S4-3 specifically comprises:

step S4-3-1: performing morphological analysis on the soil remediation boundary region to obtain morphological data of a remediation region;

step S4-3-2: performing region area calculation on the soil remediation boundary region based on the morphological data of the remediation region to obtain an area of a to-be-remediated boundary region;

step S4-3-3: comparing an area of a to-be-remediated boundary region based on a preset area threshold of the soil remediation boundary region, and if the preset area threshold of the soil remediation boundary region is greater than the area of the to-be-remediated boundary region, determining that the soil remediation boundary region is a relatively small boundary region, and performing acceleration adjustment amplitude analysis to obtain acceleration adjustment amplitude data;

step S4-3-4: performing dynamic acceleration adjustment on the soil weight-conveyor belt speed ratio data based on the acceleration adjustment magnitude data of the conveyor belt to obtain the dynamic acceleration adjustment data;

step S4-3-5: if the preset area threshold of the soil remediation boundary region is less than or equal to the area of the to-be-remediated boundary region, determining that the soil remediation boundary region is a relatively large boundary region, and performing deceleration adjustment amplitude analysis to obtain deceleration adjustment amplitude data; and step S4-3-6: performing dynamic deceleration adjustment on the soil weight-conveyor belt speed ratio data based on the deceleration adjustment magnitude data to obtain the dynamic deceleration adjustment data; and step S4-4: performing transient feeding speed calculation on the dynamic simulation data for soil leaching to obtain a transient feeding speed;

step S5: performing adaptive feeding speed compensation optimization based on the dynamic speed adjustment data of the conveyor belt to obtain a transient feeding compensation speed; performing real-time parameter adjustment on the front-end conveying device based on the transient feeding compensation speed, and acquiring operating status data for real-time adjustment; and step S6: performing error parameter identification on the operating status data for real-time adjustment based on the dynamic simulation data for soil leaching to obtain a control error parameter; and performing dynamic feeding balance control optimization on the conveying device based on the control error parameter to generate a dynamic feeding control parameter so as to carry out a soil leaching remediation control operation.

2. The control method of a front-end conveying device for soil leaching remediation according to claim 1, wherein the step S1 specifically comprises:

step S1-1: performing real-time work monitoring on the front-end conveying device to acquire the device monitoring status data, wherein the device monitoring status data comprises the soil weight parameter, the feeding rate of the feeder, and the conveyor belt speed;

step S1-2: acquiring the image of the to-be-remediated soil from the conveying device;

step S1-3: performing visual identification of soil boundaries on the image of the to-be-remediated soil from the conveying device to extract a soil contour line;

step S1-4: performing boundary segmentation on the image of the to-be-remediated soil from the conveying device based on the soil contour line to obtain the soil remediation boundary region;

step S1-5: performing soil granularity identification on the soil remediation boundary region to obtain soil granularity; and step S1-6: performing quantitative analysis for soil contamination based on the soil granularity to obtain soil contamination degree data.

3. The control method of a front-end conveying device for soil leaching remediation according to claim 1, wherein the step S2 specifically comprises:

step S2-1: performing weight perturbation analysis on the conveyor belt speed based on the soil weight parameter to obtain conveyor belt speed perturbation data for a weight;

step S2-2: performing nonlinear correlation mapping learning on the soil weight parameter and the conveyor belt speed based on the conveyor belt speed perturbation data for the weight to obtain the weight-conveying speed correlation data;

step S2-3: performing speed fluctuation response analysis on the conveyor belt speed and the feeding rate of the feeder to obtain speed-influenced feeding response data; and step S2-4: performing multi-level cooperative response neural network learning on the weight-conveying speed correlation data and the speed-influenced feeding response data to generate the cooperative response data of the conveying device.

4. The control method of a front-end conveying device for soil leaching remediation according to claim 1, wherein the step S3 specifically comprises:

step S3-1: acquiring the front-end conveying device monitoring image;

step S3-2: performing component space topological analysis on the front-end conveying device monitoring image to obtain component space topological data;

step S3-3: performing three-dimensional structure analysis based on the component space topological data to obtain the three-dimensional structure data of the components;

step S3-4: performing three-dimensional device reconstruction on the front-end conveying device monitoring image by using the three-dimensional structure data of the components to construct a three-dimensional device structure model; and step S3-5: performing dynamic parameter rendering on the three-dimensional device structure model based on the cooperative response data of the conveying device to construct the dynamic rendering model of the conveying device.

5. The control method of a front-end conveying device for soil leaching remediation according to claim 1, wherein the step S5 specifically comprises:

step S5-1: performing adaptive feeding speed compensation optimization on the transient feeding speed based on the soil contamination degree data and the dynamic speed adjustment data of the conveyor belt to obtain the transient feeding compensation speed;

step S5-2: performing optimal cooperative control decision-making on the dynamic speed adjustment data of the conveyor belt and the transient feeding compensation speed to obtain an optimal control parameter of the conveying device; and step S5-3: performing real-time parameter adjustment on the front-end conveying device based on the optimal control parameter of the conveying device, and acquiring the operating status data for real-time adjustment.

6. The control method of a front-end conveying device for soil leaching remediation according to claim 5, wherein the step S5-1 specifically comprises:

step S5-1-1: performing leaching material requirement calculation based on the soil contamination degree data to obtain material requirement data of a current device;

step S5-1-2: performing feeding speed range analysis on the transient feeding speed based on the dynamic speed adjustment data of the conveyor belt to obtain feeding speed range data;

step S5-1-3: performing adaptive feeding speed adjustment on the feeding speed range data based on the material requirement data of the current device to obtain an adaptive feeding speed; and step S5-1-4: performing feeding difference compensation optimization on the transient feeding speed based on the adaptive feeding speed to obtain the transient feeding compensation speed.

7. The control method of a front-end conveying device for soil leaching remediation according to claim 1, wherein the step S6 specifically comprises:

step S6-1: performing error parameter identification on the operating status data for real-time adjustment based on the dynamic simulation data for soil leaching to obtain the control error parameter;

step S6-2: performing error control optimization on the optimal control parameter of the conveying device based on the control error parameter to obtain an error optimization parameter;

step S6-3: performing dynamic feeding balance control optimization on the conveying device based on the error optimization parameter to generate a dynamic feeding control parameter; and step S6-4: carrying out the soil leaching remediation control operation based on the dynamic feeding control parameter.

8. A control system of a front-end conveying device for soil leaching remediation, wherein the control system is used for executing the control method of the front-end conveying device for soil leaching remediation according to claim 1 and comprises:

a remediation boundary module, configured to acquire the device monitoring status data and the image of to-be-remediated soil from the conveying device, wherein the device monitoring status data comprises the soil weight parameter, the feeding rate of the feeder, and the conveyor belt speed; and to obtain the soil remediation boundary region based on the image of the to-be-remediated soil from the conveying device;

a cooperative response module, configured to perform the nonlinear correlation mapping learning on the conveyor belt speed based on the soil weight parameter to obtain the weight-conveying speed correlation data, and to perform the multi-level cooperative response neural network learning on the conveyor belt speed and the feeding rate of the feeder based on the weight-conveying speed correlation data to generate the cooperative response data of the conveying device;

a dynamic parameter rendering module, configured to acquire the front-end conveying device monitoring image, obtain the three-dimensional structure data of the components based on the front-end conveying device monitoring image, and perform the dynamic parameter rendering on the three-dimensional structure data of the components based on the cooperative response data of the conveying device to construct the dynamic rendering model of the conveying device;

a dynamic simulation module, configured to perform the digital dynamic simulation for soil leaching on the dynamic rendering model of the conveying device to obtain the dynamic simulation data for soil leaching, and to perform the dynamic speed parameter adjustment on the dynamic simulation data for soil leaching based on the soil remediation boundary region to obtain the dynamic speed adjustment data of the conveyor belt;

a transient feeding compensation module, configured to perform the adaptive feeding speed compensation optimization based on the dynamic speed adjustment data of the conveyor belt to obtain the transient feeding compensation speed, to perform the real-time parameter adjustment on the front-end conveying device based on the transient feeding compensation speed, and to acquire the operating status data for real-time adjustment; and a dynamic feeding balance module, configured to perform the error parameter identification on the operating status data for real-time adjustment based on the dynamic simulation data for soil leaching to obtain the control error parameter, and to perform the dynamic feeding balance control optimization on the conveying device based on the control error parameter to generate the dynamic feeding control parameter so as to carry out the soil leaching remediation control operation.

* * * * *